United States Patent
Jong

(10) Patent No.: US 6,737,502 B2
(45) Date of Patent: May 18, 2004

(54) METHOD OF SYNTHESIZING POLYIMIDES

(75) Inventor: Shean-Jeng Jong, Tao-Yuan (KR)

(73) Assignee: Chung-Shan Institute of Science & Technology, Tao-Yuan (TW)

( * ) Notice: Subject to any disclaimer, the term of this patent is extended or adjusted under 35 U.S.C. 154(b) by 0 days.

(21) Appl. No.: 10/162,669

(22) Filed: Jun. 6, 2002

(65) Prior Publication Data

US 2003/0232963 A1 Dec. 18, 2003

(51) Int. Cl.[7] .................. C08G 73/10; C08G 69/28; C08G 69/26
(52) U.S. Cl. .................. 528/353; 528/125; 528/128; 528/172; 528/173; 528/174; 528/170; 528/179; 528/185; 528/188; 528/220; 528/229; 528/350
(58) Field of Search .................. 528/125, 128, 528/170, 172–173, 174, 179, 185, 188, 220, 229, 350, 353, 126, 176

(56) References Cited

U.S. PATENT DOCUMENTS

| | | | | |
|---|---|---|---|---|
| 3,356,648 A | * | 12/1967 | Rogers | 528/353 |
| 3,959,350 A | * | 5/1976 | Rogers | 528/185 |
| 4,244,857 A | * | 1/1981 | Serafini et al. | 523/468 |
| 4,912,197 A | * | 3/1990 | Hayes | 528/353 |
| 5,049,649 A | * | 9/1991 | Rohitkumar | 528/353 |
| 6,040,418 A | * | 3/2000 | Yamamoto et al. | 528/353 |

* cited by examiner

*Primary Examiner*—P. Hampton-Hightower
(74) *Attorney, Agent, or Firm*—Bacon & Thomas

(57) ABSTRACT

A solvent-free, catalyst-free and contamination-free method of synthesis of polyimides is disclosed. The method includes polymerizing a diamine with 2,2-bis(3,4-dicarboxyphenyl) hexafluoropropane dianhydride (6FDA) at a pressure of 0.1–760 mm Hg, preferably a reduced pressure at about 36 mm Hg, and a temperature of 90–400° C., preferably 10–240° C.

15 Claims, No Drawings

METHOD OF SYNTHESIZING POLYIMIDES

FIELD OF THE INVENTION

The present invention is related to a method of synthesizing polyimides, and in particular to a solvent-free, catalyst-free and contamination-free method of synthesizing polyimides.

BACKGROUND OF THE INVENTION

Polyimides are a very versatile resin and useful in wide applications, which are heat resistant and low dielectric materials. Typical applications include an insulation layer in a semiconductor device and a protection film of a solar cell. One method for synthesizing polyimides is polymerizing a diamine compound and a dianhydride compound as shown in the following:

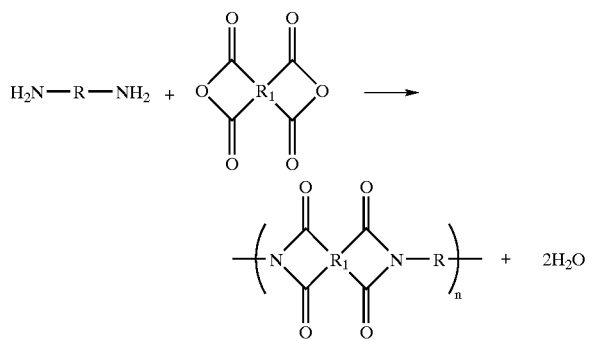

wherein R and $R_1$ are the main structures of the diamine compound and dianhydride compound, respectively.

U.S. Pat. No. 4,244,857 (1981) discloses polyimides having the following structure:

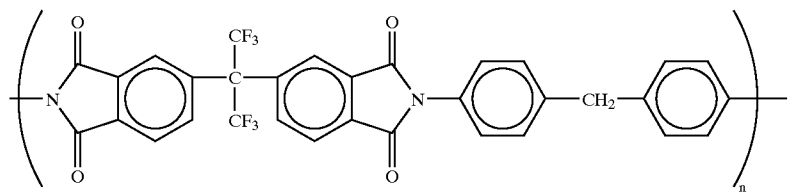

which is useful as a curing agent for polyepoxides.

Ger Offen 2223819 (1972) (equivalent to GB patent No. 1396331), Ger Offen 2223807 (1972) (equivalent to GB patent No. 1396332), and U.S. Pat. No. 3,959,350 (1976) disclose polyimides having the following structure:

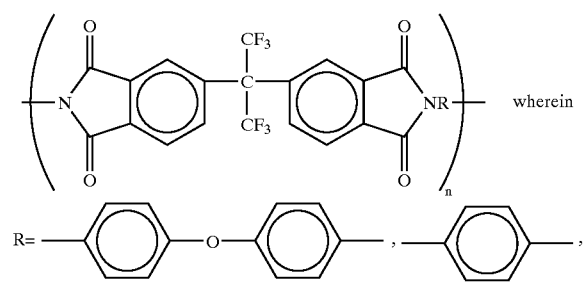 wherein

R=  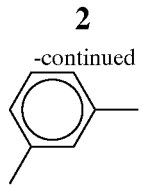

U.S. Pat. No. 3,356,648 (1967) discloses polyimides having the following structure, which can be used to form a film and fibers:

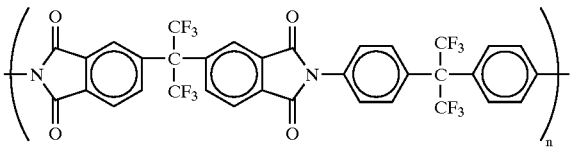

In the synthesis of polyimides a special organic solvent is required, for examples N-methyl-2-pyrrolidone (NMP), m-cresol, and pyridine (Py), because the diamine compound and/or the dianhydride compound are not soluble to most of the organic solvents.

SUMMARY OF THE INVENTION

A primary objective of the present invention is to provide a more environmentally friendly method of synthesizing polyimides, wherein no solvent, and no Lewis acid catalyst are needed. In the method of the present application the reactants, a diamine compound and a dianhydride compound, are heated under a reduced pressure to carry out a ring-opening polyaddition reaction and a cyclodehydration reaction to form a polyimide product.

DETAILED DESCRIPTION OF THE INVENTION

The present invention discloses a method of synthesizing a polyimide comprising heating a diamine compound and a dianhydride compound in the absence of an organic solvent and under a reduced pressure, so that a ring-opening polyaddition reaction and a cyclodehydration reaction are carried out to form a polyimide product, wherein said dianhydride compound is 2,2-bis(3,4-dicarboxyphenyl) hexafluoropropane dianhydride (hereinafter abbreviated as 6FDA).

Preferbly, said diamine compound is 4,4'-methylenedianiline [bis(4-aminophenyl) methane], 4-(4-aminophenoxy)aniline, 2,2-bis(4-aminophenyl) hexafluoropropane, 4-(2-trifluoromethyl-4-aminophenyl)-3-trifluoromethyl aniline or a mixture thereof in any ratio.

Preferably, said reduced pressure is lower than 100 mmHg, and more preferably is about 36 mmHg. Said heating causes said ring-opening polyaddition reaction and said cyclodehydration reaction being carried out at a temperature ranging from 90 to 400° C., and more preferably from 100 to 240° C.

Preferably, said diamine compound and said dianhydride compound are in a molar ratio of about 1:1.

The present invention is more particularly described in the following examples that are intended as illustrative only since numerous modifications and variations therein will be apparent to those skilled in the art.

Example 1

Synthesis of

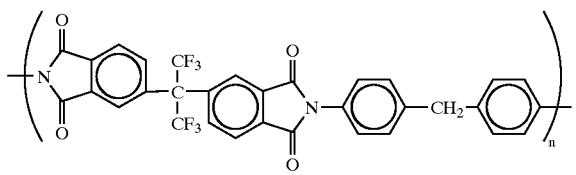

396 g (2 mmol) of 4,4'-methylenedianiline and 888 g (2 mmol) of 6FDA were added to a 50 ml round-bottom beaker, mixed, and then heated at 100° C. under 36 mmHg for one hour, and heated at 200° C. for another four hours. A polyimide product was obtained with the following properties:

| Mn* | Mw* | Mp* | Mw/Mn (polydispersity) |
|---|---|---|---|
| 17371 | 74312 | 25625 | 4.28 |

*Mn: number averaged molecular weight; Mw: weight averaged molecular weight; Mp: molecular weight peak value
Glass transition temperature (Tg): 269° C.
10% weight loss temperature in $N_2$: 545° C.

Control Example 1

Synthesis of

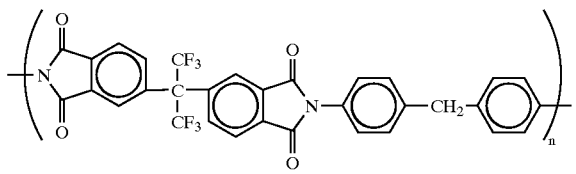

396 g (2 mmol) of 4,4'-methylenedianiline, 888 g (2 mmol) of 6FDA and 10 g of N-methyl-2-pyrrolidone (NMP) were added to a 50 ml round-bottom beaker, and the mixture was stirred in $N_2$ atmosphere at room temperature for 48 hours. The reaction mixture was then poured into 500 ml water to form a precipitate. The precipitate was filtered out and heated at 200° C. under 36 mmHg for four hours to obtain a polyimide product. The polyimide product has the following properties:

| Mn* | Mw* | Mp* | Mw/Mn (polydispersity) |
|---|---|---|---|
| 12045 | 71825 | 26398 | 5.96 |

*The definitions are same as in Example 1
Glass transition temperature (Tg): 283° C.
10% weight loss temperature in $N_2$: 520° C.

Example 2

Synthesis of

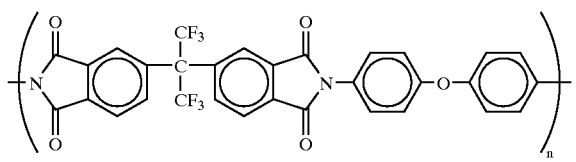

400 g (2 mmol) of 4-(4-aminophenoxy)aniline and 888 g (2 mmol) of 6FDA were added to a 50 ml round-bottom beaker, mixed, and then heated at 190° C. under 36 mmHg for one hour, and heated at 240° C. for another one hour. A polyimide product was obtained with the following properties:

| Mn* | Mw* | Mp* | Mw/Mn (polydispersity) |
|---|---|---|---|
| 19139 | 113674 | 40807 | 5.94 |

*The definitions are same as in Example 1
Glass transition temperature (Tg): 283° C.
10% weight loss temperature in $N_2$: 530° C.

Example 3

Synthesis of

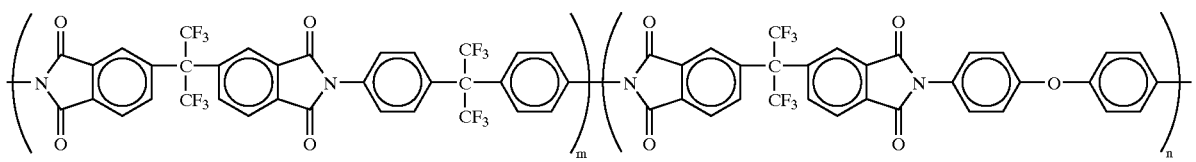

200 g (1 mmol) of 4-(4-aminophenoxy)aniline, 234 g (1 mmol) of 2,2-bis(4-aminophenyl)hexafluoropropane and 888 g (2 mmol) of 6FDA were added to a 50 ml round-bottom beaker, mixed, and then heated at 190° C. under 36 mmHg for one hour, and heated at 240° C. for another one hour. A polyimide product was obtained with the following properties:

| Mn* | Mw* | Mp* | Mw/Mn (polydispersity) |
|---|---|---|---|
| 11742 | 26112 | 19531 | 2.22 |

*The definitions are same as in Example 1
Glass transition temperature (Tg): 229° C.
10% weight loss temperature in $N_2$: 569° C.

Example 4

Synthesis of

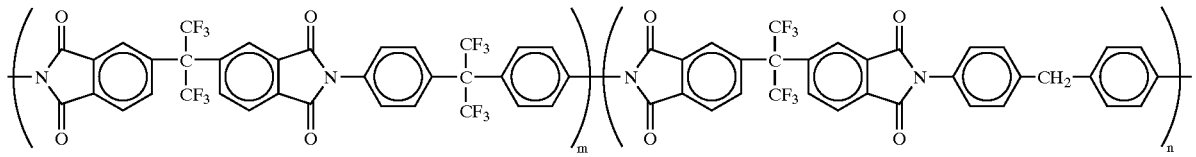

198 g (1 mmol) of 4,4'-methylenedianiline, 234 g (1 mmol) of 2,2-bis(4-aminophenyl)hexafluoropropane and 888 g (2 mmol) of 6FDA were added to a 50 ml round-bottom beaker, mixed, and then heated at 100° C. under 36 mmHg for one hour, and heated at 240° C. for another one hour. A polyimide product was obtained with the following properties:

| Mn* | Mw* | Mp* | Mw/Mn (polydispersity) |
|---|---|---|---|
| 12331 | 66582 | 35938 | 5.4 |

*The definitions are same as in Example 1
Glass transition temperature (Tg): 264° C.
10% weight loss temperature in $N_2$: 552° C.

Example 5

Synthesis of

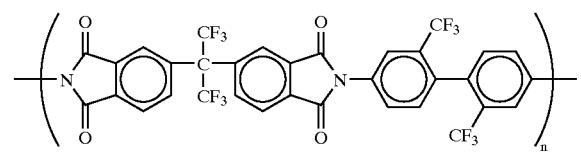

640 g (2 mmol) of 4-(2-trifluoromethyl-4-aminophenyl)-3-trifluoromethyl aniline and 888 g (2 mmol) of 6FDA were added to a 50 ml round-bottom beaker, mixed, and then heated at 180° C. under 36 mmHg for one hour, and heated at 240° C. for another one hour. A polyimide product was obtained with the following properties:

| Mn* | Mw* | Mp* | Mw/Mn (polydispersity) |
|---|---|---|---|
| 24737 | 158133 | 74580 | 6.39 |

*The definitions are same as in Example 1
Glass transition temperature (Tg): 300° C.
10% weight loss temperature in $N_2$: 559° C.

Although the present invention has been described with reference to specific details of certain embodiments thereof, it is not intended that such details should be regarded as limitations upon the scope of the invention except as and to the extent that they are included in the accompanying claims. Many modifications and variations are possible in light of the above disclosure.

What is claimed is:

1. A method of synthesizing a polyimide comprising heating a diamine compound and a dianhydride compound in the absence of an organic solvent and under a reduced pressure, so that a ring-opening polyaddition reaction and a cyclodehydration reaction are carried out to form a polyimide product, wherein said dianhydride compound is 2,2-bis(3,4-dicarboxyphenyl)hexafluoropropane dianhydride.

2. The method according to claim 1, wherein said diamine compound comprises 4,4'-methylenedianiline [(bis(4-aminophenyl) methane], 4-(4-aminophenoxy)aniline, 2,2-bis(4-aminophenyl)hexafluoropropane or 4-(2-trifluoromethyl-4-aminophenyl)-3-trifluoromethyl aniline.

3. The method according to claim 1, wherein said reduced pressure is lower than 100 mmHg, and said heating causes said ring-opening polyaddition reaction and said cyclodehydration reaction being carried out at a temperature ranging from 90 to 400° C.

4. The method according to claim 3, wherein said reduced pressure is about 36 mmHg, and said heating causes said ring-opening polyaddition reaction and said cyclodehydration reaction being carried out at a temperature ranging from 100 to 240° C.

5. The method according to claim 1, wherein said diamine compound and said dianhydride compound are in a molar ratio of about 1:1.

6. A method of synthesizing a polyimide consisting essentially of heating a diamine compound and a dianhydride compound in the absence of an organic solvent and under a reduced pressure, so that a ring-opening polyaddition reaction and a cyclodehydration reaction are carried out to form a polyimide product, wherein said dianhydride compound is 2,2-bis(3,4-dicarboxyphenyl)hexafluoropropane dianhydride.

7. The method according to claim 6, wherein said diamine compound is 4,4'-methylenedianiline [bis(4-aminophenyl) methane]; 4-(4-aminophenoxy)aniline; 2,2-bis(4-aminophenyl)hexafluoropropane, or 4-(2-trifluoromethyl-4-aminophenyl)-3-trifluoromethyl aniline.

8. The method according to claim 6, wherein said reduced pressure is lower than 100 mmHg, and said heating causes said ring-opening polyaddition reaction and said cyclodehydration reaction being carried out at a temperature ranging from 90 to 400° C.

9. The method according to claim 8, wherein said reduced pressure is about 36 mmHg, and said heating causes said ring-opening polyaddition reaction and said cyclodehydration reaction being carried out at a temperature ranging from 100 to 240° C.

10. The method according to claim 6, wherein said diamine compound and said dianhydride compound are in a molar ratio of about 1:1.

11. A method of synthesizing a polyimide consisting of heating a diamine compound and a dianhydride compound in the absence of an organic solvent and under a reduced pressure, so that a ring-opening polyaddition reaction and a cyclodehydration reaction are carried out to form a polyimide product, wherein said dianhydride compound is 2,2-bis (3,4-dicarboxyphenyl)hexafluoropropane dianhydride.

12. The method according to claim 11, wherein said diamine compound is 4,4'-methylenedianiline [bis(4-aminophenyl) methane]; 4-(4-aminophenoxy)aniline; 2,2bis (4-aminophenyl)hexafluoropropane; or 4-(2-trifluoromethyl-4-aminophenyl)3-trifluoromethyl aniline.

13. The method according to claim 11, wherein said reduced pressure is lower than 100 mmHg, and said heating causes said ring-opening polyaddition reaction and said cyclodehydration reaction being carried out at a temperature ranging from 90 to 400° C.

14. The method according to claim 13, wherein said reduced pressure is about 36 mmHg, and said heating causes said ring-opening polyaddition reaction and said cyclodehydration reaction being carried out at a temperature ranging from 100 to 240° C.

15. The method according to claim 11, wherein said diamine compound and said dianhydride compound are in a molar ratio of about 1:1.

* * * * *